(12) United States Patent
Morris

(10) Patent No.: US 6,341,756 B1
(45) Date of Patent: Jan. 29, 2002

(54) FISHING POLE HOLDER

(76) Inventor: Allen J. Morris, 8720 Buffalo, Commerce Township, MI (US) 48382

( * ) Notice: Subject to any disclaimer, the term of this patent is extended or adjusted under 35 U.S.C. 154(b) by 0 days.

(21) Appl. No.: 09/454,086

(22) Filed: Dec. 3, 1999

Related U.S. Application Data

(60) Provisional application No. 60/110,741, filed on Dec. 3, 1998.

(51) Int. Cl.$^7$ .............................................. A01K 97/10
(52) U.S. Cl. ......................... 248/530; 248/88; 248/533; 248/545
(58) Field of Search ................................ 248/530, 533, 248/88, 87, 532, 545, 85, 523, 524

(56) References Cited

U.S. PATENT DOCUMENTS

| | | | | |
|---|---|---|---|---|
| 729,485 A | * | 5/1903 | Briner | 248/530 |
| 1,092,548 A | * | 4/1914 | Weber | 248/530 |
| 1,987,842 A | * | 1/1935 | Sampson | 248/530 |
| 2,000,263 A | * | 5/1935 | Teetor | 248/530 |
| 2,451,363 A | * | 10/1948 | Sonner, Jr. | 248/530 |
| 2,539,080 A | * | 1/1951 | Hoover | 248/530 |
| 2,564,065 A | * | 8/1951 | Jaden | 248/530 |
| 2,787,431 A | * | 4/1957 | Smith | 248/530 |
| 4,261,128 A | * | 4/1981 | Dobbins | 43/21.2 |
| 4,498,257 A | * | 2/1985 | Jekel | 248/530 |
| 4,748,762 A | * | 6/1988 | Campbell | 248/530 |

* cited by examiner

*Primary Examiner*—Anita King
*Assistant Examiner*—Kimberly T. Wood
(74) *Attorney, Agent, or Firm*—Rader, Fishman & Grauer PLLC

(57) ABSTRACT

A holder for a fishing pole includes a relatively moveable ground engaging member for pivotal attachment to the end of the fishing pole handle and can be selectively moved from an unextended storage position to an extended working position, the ground engaging member having a generally arcuate cross-section and tapering in both length and height and having an arcuate distal end for insertion into the ground to maintain a fishing pole at a desired operating position without the need for a user to physically hold the fishing pole. The fishing pole holder can be permanently attached to the fishing rod handle so that the holding feature is always available for use.

15 Claims, 3 Drawing Sheets

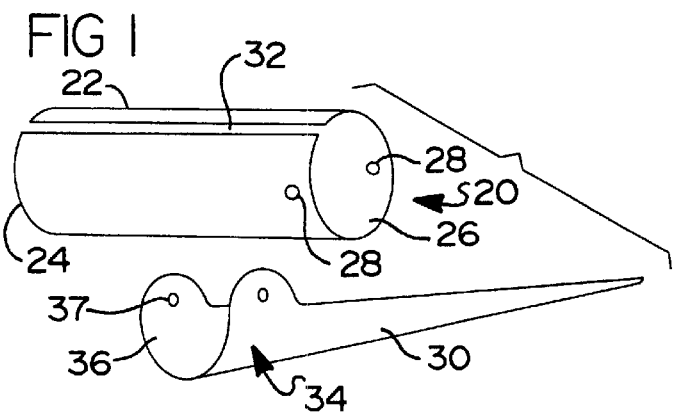
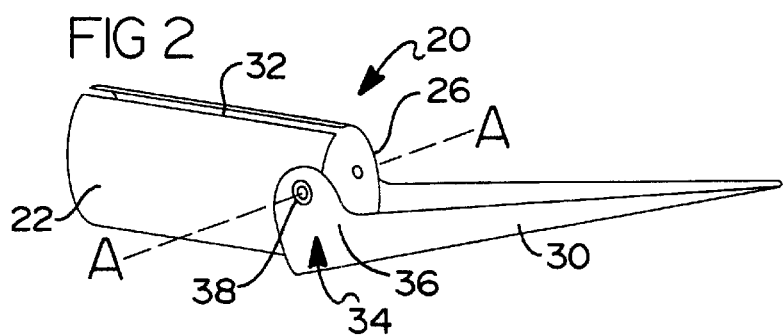
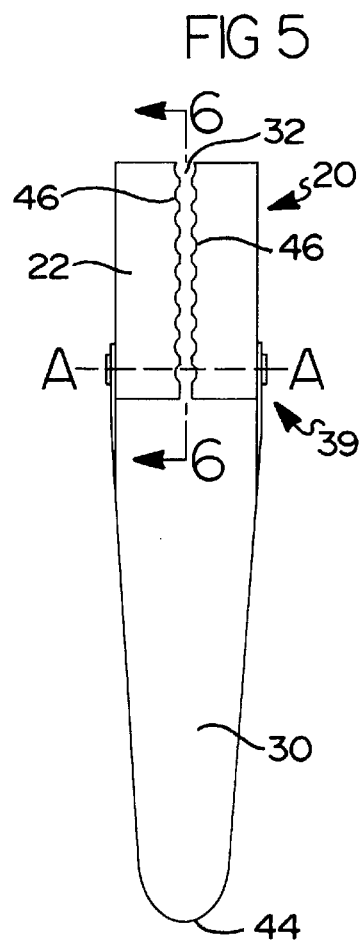
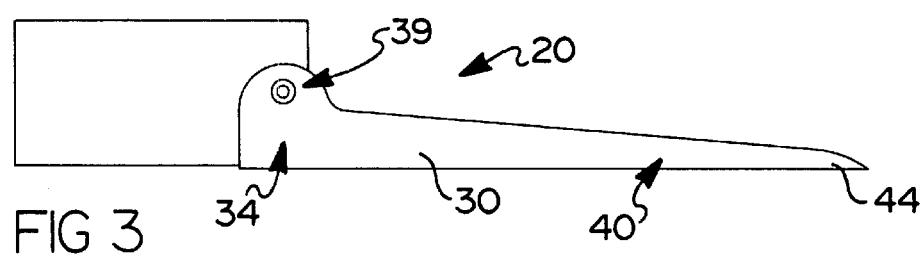
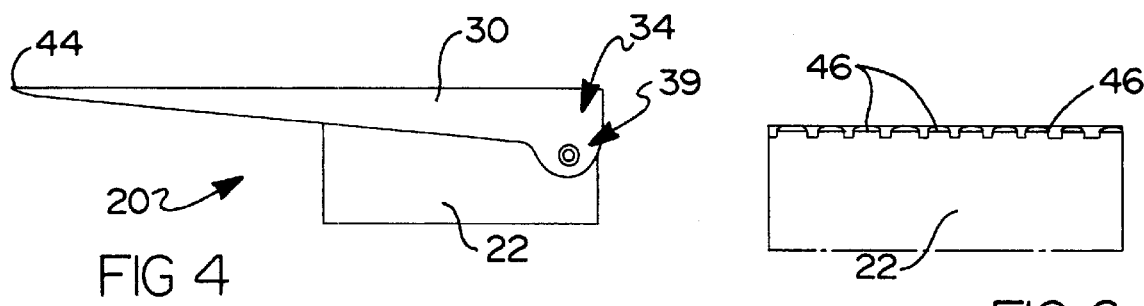
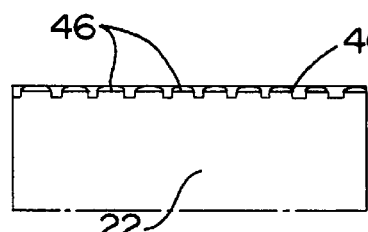

FISHING POLE HOLDER

CROSS REFERENCE TO RELATED APPLICATION

This Application is based on U.S. Provisional Application Ser. No. 60/110,741, filed Dec. 3, 1998 by the same inventor, entitled "FISHING POLE HOLDER." Applicant hereby claims the priority date of this earlier filed Application pursuant to 35 U.S.C. § 119(e).

FIELD OF THE INVENTION

The present invention is directed to a holder for a fishing pole and, more particularly, a collapsible fishing pole holder that can be carried by the fishing pole handle for convenience of use.

BACKGROUND OF THE INVENTION

Fishing rod holders are known in the prior art for holding a fishing rod and allowing multiple rods to be used at once by a single fisherman. Some fishing rod holders are mounted on boats and have a generally cylindrical body that allows a fishing rod to be easily inserted and removed from the holder to allow a fisherman to take control of the rod to land a fish.

Other known rod holders are used for holding a fishing pole in the ground, for example, along the bank of a river. Fishing rod holders of the latter type include a spring biased rod mounted inside a handle of a fishing rod which telescopically extends out of the handle end for insertion into the ground. Another known type includes a removable attachment cylinder and a folding blade that is inserted into the ground to hold a fishing rod. When the holder is no longer needed the cylindrical body is easily removed from the fishing rod handle and can be folded to fit into a tackle box or pocket for storage. However, such removable and/or complex fishing rod holders are not permanently attached to a fishing rod handle and are often forgotten and not ready for use. In addition, conventional fishing rod holders having a folding blade have sliding, loose pivotal connections where the folding blade is able to slide axially relative to the handle. Such loose pivotal arrangements require additional locking elements to hold the folding blade in desired positions and the inherent looseness of such connections increases noise. The resulting sloppiness of the holder reduces consumer confidence in the structural integrity of the device.

SUMMARY OF THE INVENTION

The present invention is directed to a fishing pole holder having a relatively movable ground engaging member for pivotal attachment to the end of the fishing pole handle, the ground engaging member being selectively movable from an unextended storage position to an extended working position, said ground engaging member having a generally arcuate cross-section and tapering in both length and height and having an arcuate distal end for insertion into the ground.

The present invention further includes a fishing pole holder having a main body adapted to be attached to a distal end of the fishing pole handle, a ground engaging member pivotally connected to the main body for movement from an unextended storage position to an extended working position, a ground engaging member having a generally arcuate cross-section and tapering in both length and height and having an arcuate distal end for insertion into a ground surface.

The present invention further includes a fixed pivot connection between the ground engaging member and the fishing pole handle such that no unwanted looseness is present in the fishing pole holder. For example, the size of any aperture in the ground engaging member is approximately the same size as the diameter of any pivot pin or fastener that is utilized for creating a pivot joint. Having a relatively tight pivot joint also helps hold the ground engaging member in a desired position without the need for additional locking elements, as in the prior art.

The present invention further includes a generally arcuate distal end on the ground engaging member to prevent possible injury to a user, yet still provide adequate insertion properties when the ground engaging member is inserted into a ground surface. Moreover, an arcuate end shape provides improved strength for the ground engaging member to be inserted without deformation to the tip.

Preferably, the ground engaging member of the present invention is permanently connected to a handle of a fishing pole to eliminate any chance of losing the fishing pole holder and provide improved convenience to a fisherman by eliminating the need to carry a separate pole holder and eliminate the time required to assemble the pole to a holder.

BRIEF DESCRIPTION OF THE DRAWINGS

The features and inventive aspects of the present invention will become more apparent upon reading the following detailed description, claims, and drawings, of which the following is a brief description:

FIGS. 1 and 2 show perspective views of the present invention according to a first embodiment.

FIGS. 3 and 4 show side views of the present invention in an extended and a collapsed condition.

FIG. 5 is a top view of the fishing rod holder according to the present invention.

FIG. 6 shows a partial cross-sectional view taken along lines 6—6 of FIG. 5.

DETAILED DESCRIPTION OF PREFERRED EMBODIMENTS

Figure 7:
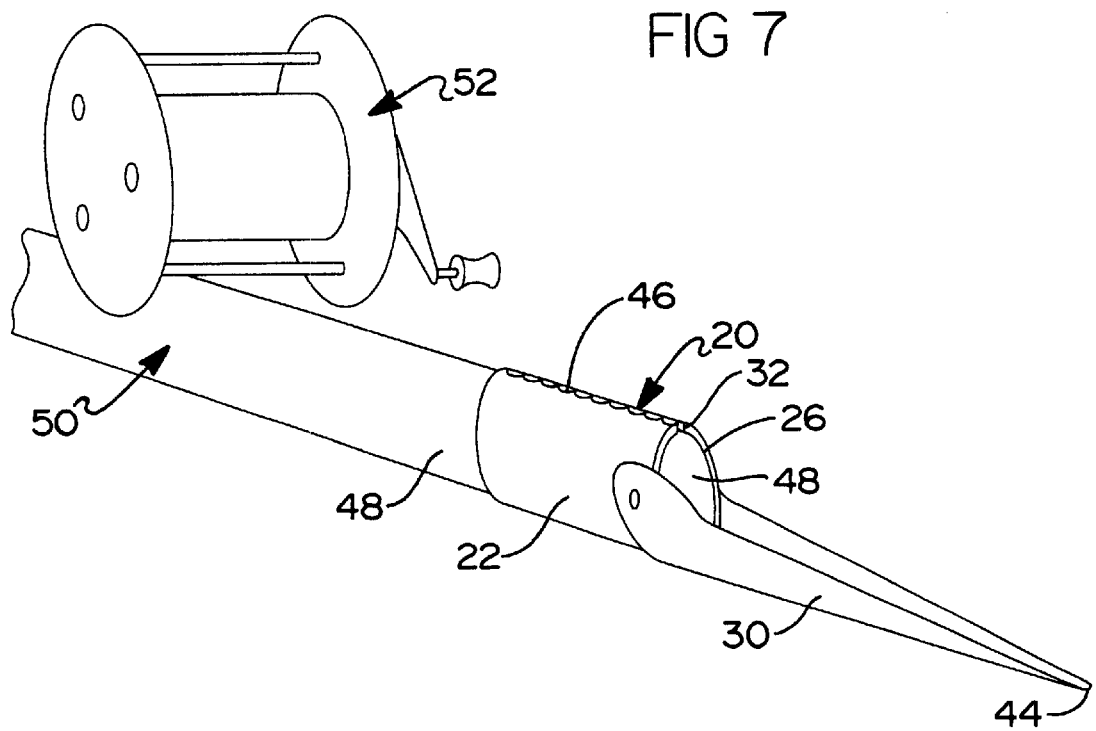
FIG. 7 is a perspective view of the present invention attached to a fishing rod.

FIG. 1 shows a fishing pole holder 20 in a disassembled condition having a main body 22 with first and second ends 24, 26. Main body 22 can be generally cylindrical having a predetermined diameter designed to matingly engage a handle of a fishing pole (not shown) in a generally permanent fashion. Apertures 28 are provided adjacent second end 26 to facilitate pivotal attachment of a ground engaging member 30. Main body 22 further includes a longitudinally extending slot 32 to provide a degree of flexibility for assembly of main body 22 onto a fishing pole handle and create a clamping effect for retaining pole holder 20 on a fishing pole.

FIGS. 2–4 show fishing pole holder 20 in varying positions. FIG. 2 illustrates ground engaging member 30 pivoted slightly upwardly into a partially folded position.

FIG. 3 shows fishing pole holder 20 in a fully extended position wherein main body 22 and relatively moving ground engaging member 30 are coaxial. In a fully extended position, a head portion 34 of ground engaging member 30 generally abuts second end 26 of main body 22 preventing ground engaging member 30 from any further pivoting motion in a clockwise direction relative to main body 22. Head portion 34 includes upwardly extending ears 36 having apertures 37 for attaching to main body 22 in a pivoting manner. In the illustrated embodiment, fasteners 38, for example, rivets, are used to connect ground engaging member 30 to main body 22 for pivotal motion about a pivot axis A. The length of the ears 36 and the location of apertures 37 relative to main body apertures 28 determine the location of pivot axis A. The location of pivot axis A is selected by adjusting one or more of the preceding dimensions such that ground engaging member 30 has sufficient clearance when pivoted to fold relative to main body 22 without interference by second end 26. In this way, a pivot joint 39 can be produced that has a fixed axis A and no substantial radial movement between the fasteners 38 and apertures 37 or aperture 28. Moreover, the respective diameters of the apertures 28, 37 are generally the same as fasteners 38 for a relatively tight pivot joint. FIG. 3 further shows ground engaging member 30 having a stake portion 40 that is generally arcuate in cross-section and has a second predetermined diameter for complementary mating engagement with main body 22 in a collapsed position. Stake portion 40 tapers from head portion 34 to distal end 44 both in height and in width to form a generally shovel-nosed stake to facilitate insertion into the ground for holding a fishing pole in a predetermined position. Preferably, distal end 44 is generally arcuate to eliminate a potential sharp point. Thus, the present invention provides a fishing pole holder 20 that acts as a handle in a collapsed or folded condition and is able to be unfolded or extended to form a stake for insertion into the ground to hold a fishing pole at a predetermined position.

FIG. 4 shows ground engaging member 30 folded over on top of main body 22 to form a generally continuous cylindrical handle having a complementary shape with a fishing pole handle to provide a comfortable structure for gripping by a user's hand. Preferably, ground engaging member 30 overlies longitudinal slot 32 to provide a generally continuous outer surface. However, ground engaging member 30 can be positioned at any circumferential position around main body 22.

Fishing pole holder 20 is preferably made from aluminum, because of its light weight and corrosion resistance properties. Aluminum also allows sufficient flexibility such that main body 22 and ground engaging member 30 can be made from a same diameter tube. For example, ground engaging member 30 when made from aluminum is flexible enough to completely fold back and matingly engage the main body and securely hold itself in place without need for additional fastening methods. However, any suitable material can be used. Non-limiting examples of other suitable materials include plastic, wood, ceramic, brass, or steel, or any combinations thereof.

FIG. 5 shows a top view of fishing pole holder 20 in a fully extended position and further including a plurality of scallops or indentations 46 along a periphery longitudinal slot 34. Scallops 46 are optional, but preferable, for providing improved retention of main body 22 to a fishing pole handle.

FIG. 6 shows a partial cross-section of main body 22 taken along lines 6—6 of FIG. 5. Scallops 46 are illustrated having downwardly projecting portions that form a generally sinusoidal surface and improved retention of main body 22 on a fishing pole handle.

FIG. 7 shows fishing pole holder 20 assembled onto a fishing pole handle 48 of a fishing pole 50 having a fishing reel 52 mounted thereto. Further, FIG. 7 shows main body 22 engaging an exterior surface of fishing pole handle 48 and second end 26 of main body 22 generally aligned with a distal end of fishing pole handle 48. Ground engaging member 30 is shown in a fully extended position. Scallops 46 aid in retaining main body 22 on fishing pole handle 48.

Figure 8:
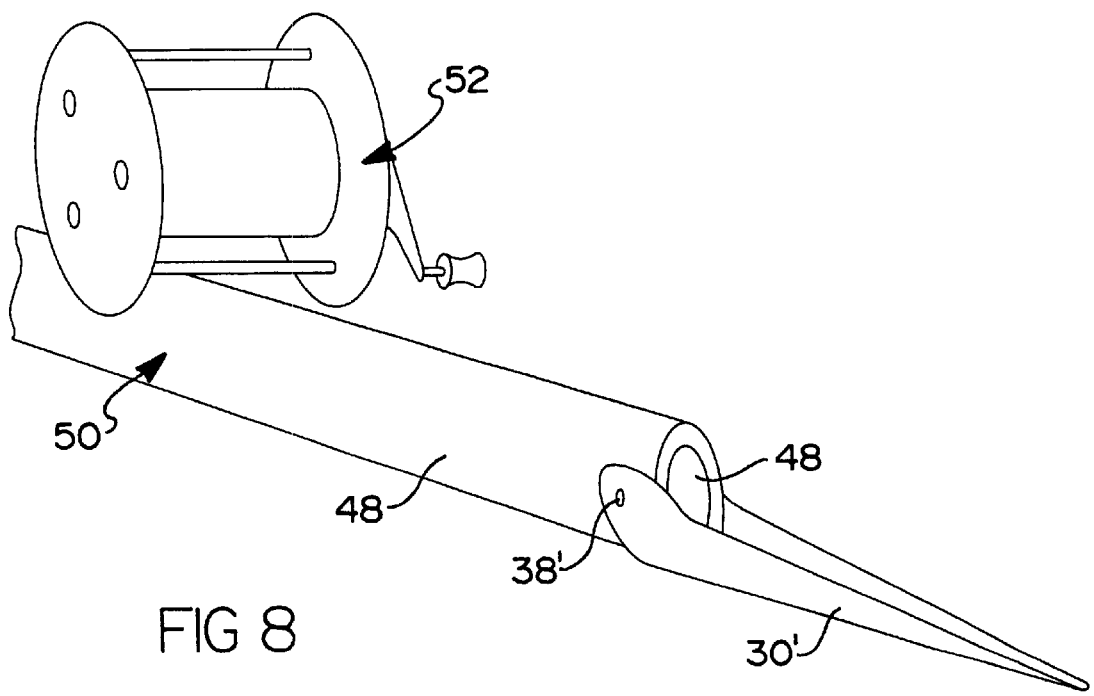
FIG. 8 is a further embodiment of the present invention.

FIG. 8 shows an alternate embodiment of the present invention wherein ground engaging member 30' is attached directly to a distal end of fishing pole handle 48 using any suitable fastener 38" or plurality of fasteners, including, rivets or a one-piece axle. Thus, main body 22 of fishing pole holder 20 is eliminated. This alternate embodiment of the present invention would be especially useful for manufacturers of fishing poles who wish to include a fishing pole holder on their fishing poles during manufacturing. In contrast, fishing pole holder 20 shown in FIGS. 1–7 is generally suitable for aftermarket sales where fishermen are able to attach a fishing pole holder to their existing fishing pole equipment. For that purpose, longitudinal slot 34 provides a certain degree of flexibility for main body 22 to adapt and fit over fishing rod handles having different shapes and different sizes.

Figure 9:
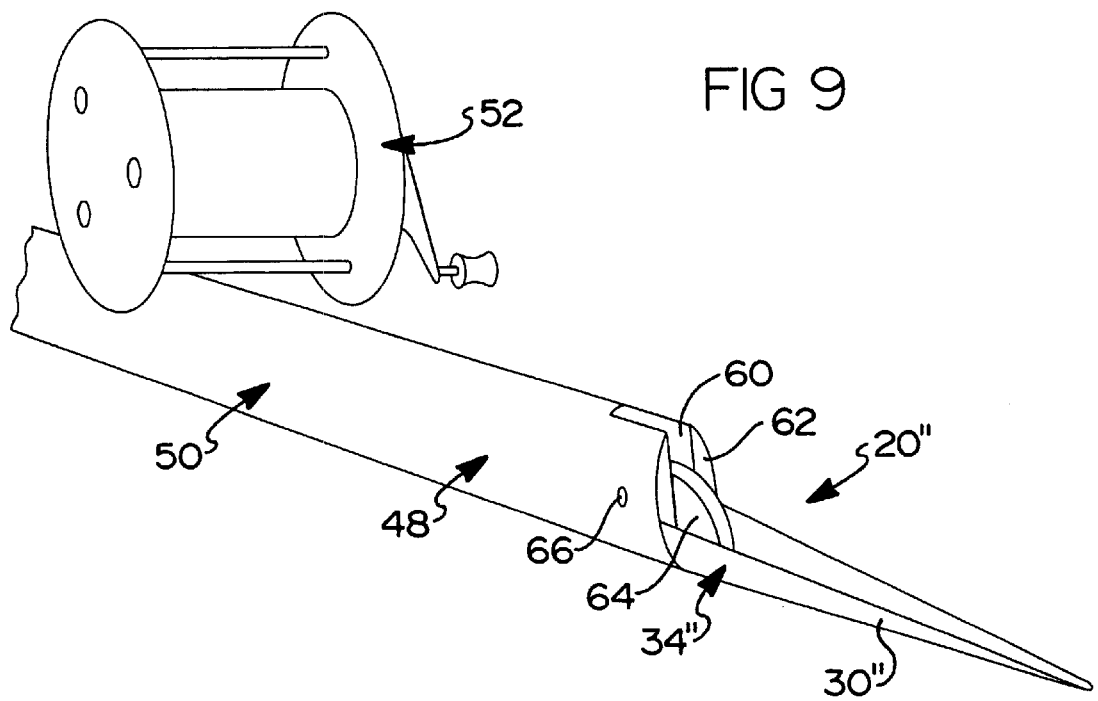
FIG. 9 is a perspective view of yet another embodiment of the present invention.
Figure 10:
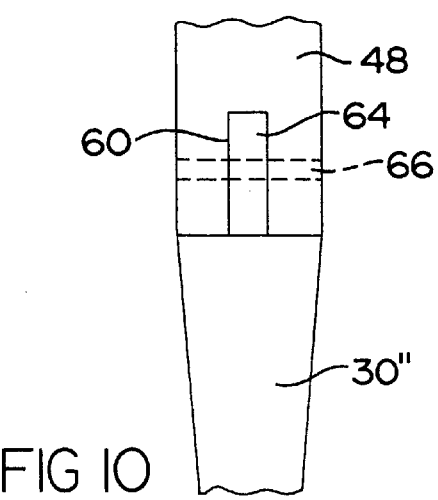
FIG. 10 is a partial top view of the connection arrangement of FIG. 9.

FIG. 9 shows a further embodiment of the present invention having a fishing pole holder 20" attached to a fishing pole 50 having a fishing reel 52 mounted thereto. Fishing pole holder 20" includes a ground engaging member 30" mounted directly to groove 60 formed in distal end 62 of fishing pole handle 48. Ground engaging member 30" further includes a tongue 64 mounted centrally in a head end 34" of ground engaging member 30" for guided relative motion in groove 60 to facilitate folding of ground engaging member 30" relative to fishing pole handle 48. An axle 66 secures tongue 64 within groove 60 and provides a pivot axis as illustrated in FIG. 10.

Thus, the present invention provides a fishing rod holder that is permanently attached to a fishing rod and ready for use. To keep main body 22 attached to a fishing pole handle 48, it is also contemplated to utilize an adhesive or other suitable attachment device for permanently retaining fishing rod holder 20 on fishing pole handle 48.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A fishing pole holder for connection to a fishing pole having a handle with an end, the holder comprising:
   a main body having first and second ends, a longitudinally extending slot to permit the main body to be adapted for attachment to the handle of the fishing pole, and opposing main body apertures positioned in proximity with the second end, and
   wherein the longitudinally extending slot of the main body includes a plurality of scallops for securing the main body to the handle of the fishing pole;
   a ground engaging member comprising (i) a head having opposed ears that are spaced apart slightly further than the opposing apertures of the main body, each ear including an aperture and (ii) an arcuate stake portion including a distal end for piercing the surface of an external formation to at least partially secure the holder;

wherein the ears of the ground engaging member are positioned radially outwardly from the main body apertures and each ear of the ground engaging member is pivotally connected to the corresponding main body aperture to form a pivot axis;

further wherein, when in a collapsed position, the stake portion of the ground engaging member is folded back about the pivot axis over the second end of the main body such that substantially the entire ground engaging member extends from the second end of the main body in the direction of the first end of the main body;

further wherein the ground engaging portion of the holder can be selectively rotated from the collapsed position to a range of extended working positions.

2. A fishing pole holder as recited in claim 1, wherein the main body and ground engaging member are comprised of a flexible material.

3. A fishing pole holder as recited in claim 2, wherein the flexible material includes aluminum.

4. A fishing pole holder as recited in claim 1, wherein each ear of the ground engaging member is separately pivotally connected to the corresponding main body aperture to form a pivot joint and the pivot joint includes a fastener.

5. A fishing pole holder as recited in claim 4, wherein the fastener includes a rivet.

6. A fishing pole holder as recited in claim 4, wherein the pivot joint has a generally tight fit so as to generally secure the ground engaging member in a desired position with respect to the handle of the fishing pole without utilizing additional locking components.

7. A fishing pole holder as recited in claim 1, wherein when in the collapsed position, the ground engaging member substantially covers the longitudinally extending slot of the main body.

8. A fishing pole holder as recited in claim 1, wherein one or more of the scallops include downwardly projecting portions to improve the retention of the main body to a pole handle.

9. A fishing pole holder as recited in claim 1, wherein the location of the pivot axis is selected such that the ground engaging member has sufficient clearance for pivoting from a partially extended position to a collapsed position without significant interference with the second end of the main body.

10. A fishing pole assembly comprising:

a fishing pole including a handle having an end; and a holder for connection to the handle of the fishing pole including a main body and a ground engaging portion;

the main body having first and second ends, a longitudinally extending slot to permit the main body to be received over the handle of the fishing pole, and opposing main body apertures positioned in proximity to the second end;

the ground engaging member comprising (i) a head having opposed ears that are spaced apart slightly further than the opposing apertures of the main body, each ear including an aperture and (ii) an arcuate stake portion including a distal end for piercing the surface of an external formation to at least partially secure the holder;

wherein the ears of the ground engaging member are positioned radially outwardly from the main body apertures and each ear of the ground engaging member is separately pivotally connected to the corresponding main body aperture to form a pivot axis;

further wherein, when in a collapsed position, the stake portion of the ground engaging member is folded back about the pivot axis over the second end of the main body such that, without adjustment of the position of the main body relative to the handle of the fishing pole, substantially the entire ground engaging member extends from the second end of the main body in the direction of the first end of the main body and becomes part of a gripping structure for the user;

further wherein, when in the collapsed position, the ground engaging member substantially covers the longitudinally extending slot of the main body to provide a generally continuous outer surface for the gripping structure; and further wherein the ground engaging member of the holder can be selectively rotated from the collapsed position to a range of extended working positions.

11. A fishing pole assembly as recited in claim 10, wherein the longitudinally extending slot of the main body includes scallops for securing the main body to the handle of the fishing pole.

12. A fishing pole assembly comprising:

a fishing pole having a terminal end and a tip end including a handle having an outer surface, a handle distal end corresponding to the terminal end of the fishing pole and a second handle end located between the terminal end and the tip end, and opposing handle apertures positioned in proximity to the handle distal end; and a ground engaging member comprising (i) a head and (ii) an arcuate stake portion including a distal end for piercing the surface of an external formation to at least partially secure the ground engaging member;

further wherein, when in a collapsed position, the stake portion of the ground engaging member is folded back about the pivot axis over the handle such that substantially the entire ground engaging member contacts the outer surface of the handle and becomes part of a gripping structure for a user;

further wherein the ground engaging portion of the holder can be selectively rotated from the collapsed position to a range of extended working positions; and wherein the distal end of the handle includes a groove and the ground engaging member includes a tongue connected to the ground engaging member, the tongue being designed to fit within the groove of the handle and provide guided relative motion for the pivoting of the ground engaging member.

13. A fishing pole assembly as recited in claim 12, wherein the handle is adapted to receive the ground engaging member when the ground, engaging member is in the collapsed position.

14. A fishing pole assembly as recited in claim 12, wherein the holder includes an axle to secure said tongue within said groove.

15. A fishing pole assembly as recited in claim 14, wherein the axle is substantially perpendicular to and passes through a portion of said tongue.

* * * * *